June 4, 1940.    B. W. KEESE    2,203,282
POWER DIVIDING AND TRANSMITTING MECHANISM
Original Filed Aug. 3, 1935
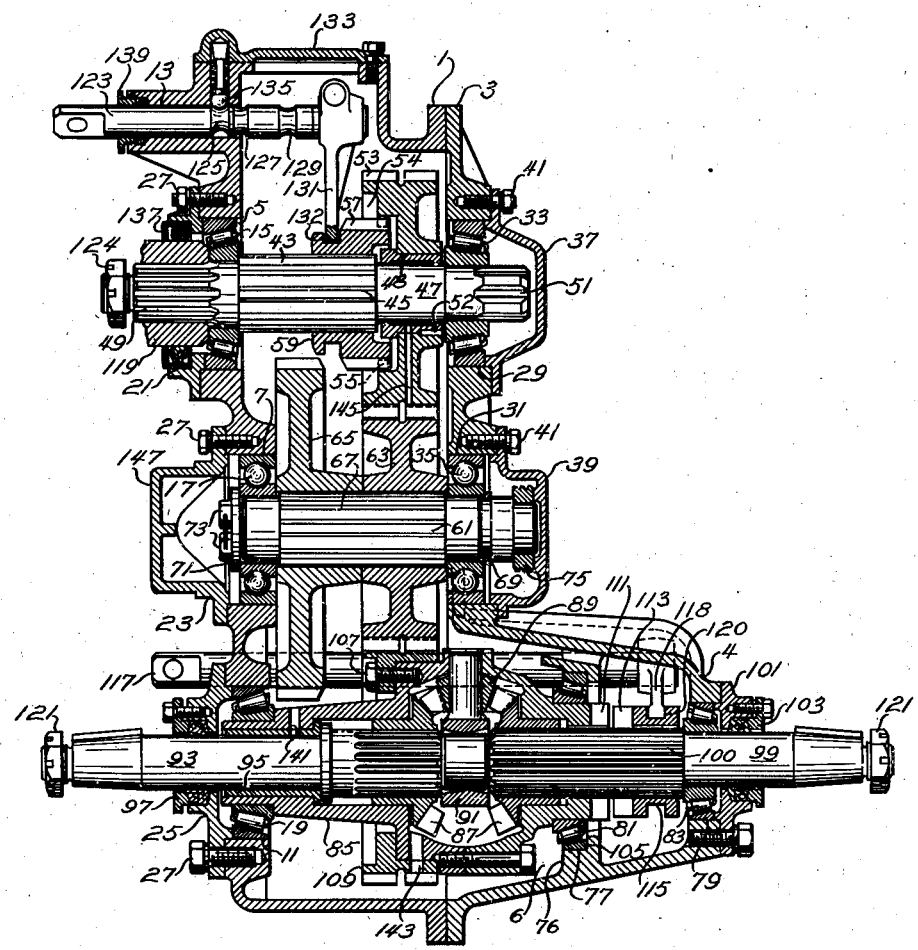
Inventor
Beverly W. Keese
By   Strauch & Hoffman
Attorneys Patented June 4, 1940

2,203,282

UNITED STATES PATENT OFFICE 2,203,282

POWER DIVIDING AND TRANSMITTING MECHANISM

Beverly W. Keese, Oshkosh, Wis., assignor to The Timken-Detroit Axle Company, Detroit, Mich., a corporation of Ohio Original application August 3, 1935, Serial No. 34,621. Divided and this application February 16, 1937, Serial No. 126,074

5 Claims. (Cl. 74—327)

This invention relates to gearing devices for the transmission of power and especially to gearing apparatus for dividing power provided by a prime mover between two loads, and also for selectively changing the torque multiplication between the prime mover and the loads.

My copending application filed August 3, 1935, Serial No. 34,621 shows several forms of such a gearing apparatus and the present application is a division of said application relating particularly to the power transmission mechanism shown in Figure 5 of the drawing thereof. This form includes a differential unit compensating for differences in the power and speed requirements of the power output shafts. While this power transmitting mechanism is adaptable to certain other special uses it is particularly suitable for use in automotive drives and is, for convenience, described below in connection therewith.

As is generally known, the conventional vehicle comprises a frame supported at its front and rear ends by road wheels, rotatably secured to the ends of front and rear axles, with motive power usually supplied only to the rear axle, but sometimes supplied to all wheels of the vehicle by using a steering driving axle in place of the conventional front axle, and providing means to divert a portion of the power to the front steering driving axle. Due to certain operating conditions for a four wheel drive of this type, it is sometimes desirable that such means be adapted to automatically compensate for differences in the torque and speed requirements of the front and rear driving axles. My invention relates to this "means," which for convenience may be termed a transfer case. It is, therefore, a primary object of my invention to provide a novel transfer case for a vehicle having front and rear driving axles.

A further object is to provide an improved transfer case having a differential mechanism therein for dividing power between the output shafts thereof, which are arranged to drive the front and rear driving axles, whereby differences in the torque and speed requirements of said output shafts may be automatically compensated for.

Under certain operating conditions, as for example when the wheels of one driving axle are on ice or slippery ground, it is desirable to be able to disconnect the differential mechanism and thus direct the power to the other set of wheels having good traction on the roadway. It is, therefore a further object of my invention to provide a novel transfer case having a compensating differential and also a lock-out mechanism within the case and selectively operable from without, whereby the operation and effect of the differential may be nullified at will.

There is an increasing need in the automotive industry for a greater selection of gear speeds due to the use of comparatively light weight vehicles for hauling heavy loads. This is especially true of the tractors used in tractor-trailer service. It is desirable to have a slow speed gear range for "heavy going" such as heavy loads in hilly country and over rough roads, and a high speed gear range for "light going," such as heavy loads in flat country and over smooth roads. Therefore, a further object of my invention is to provide in a vehicle, a novel and compact transfer case assembly having a multiplicity of gearing combinations whereby the selectivity of the gear speeds of the vehicle transmission used therewith is correspondingly increased.

A further object is to provide, in a transfer case a multiplicity of gearing combinations and a compensating differential mechanism wherein said gearing and differential mechanism are compactly arranged within a casing of minimum size and the several elements thereof are supported therein, and relatively positioned so as to give improved and efficient operation.

Another object of this invention is to provide in a transfer case a novel bearing arrangement for mounting a differential carrier in said case and also to provide improved means for lubricating the same.

A still further object is to provide a differential mechanism which is supported on a novel bearing arrangement independently of the power output shafts driven thereby and located in a casing of minimum size so as to provide ample space for a differential lock-out clutch device.

A further object of this invention is to provide in a transfer case a differential mechanism which is journalled in the case on spaced bearings and which is positioned in respect to its driving gear so that the loads on said bearings are equalized and balanced.

A still further object is to provide an improved transfer case in which the differential mechanism carrier is definitely fixed against axial movement and is driven by a train of herringbone gears mounted for free axial movement and positioned in their proper planes of rotation by interengagement with each other and the axially fixed differential carrier.

Another important object of this invention is to provide a novel casing for housing the aforementioned gearing and differential mechanism, said casing including, a narrow or reduced portion in which the gearing is arranged in an overlapped arrangement, and an extended portion in which the differential mechanism is positioned.

The above and further objects will be apparent from a study of the following description when considered with the accompanying drawing and appended claims.

In the drawing, the single figure is a sectional view of my improved transfer case taken on a plane including the axes of the several shafts thereof.

With continued reference to the drawing, wherein like reference characters refer to like parts wherever they occur, the reference numeral 1 designates a casing having a cover 3 secured to an open side thereof by suitable fastening elements, not shown. The cover 3 is generally flat for the most of its area but is provided near its lower end with an outwardly bulged or projecting portion 4 which forms a recess 6 opening into the inside of casing 1. Thus the casing is relatively narrow or wafer shaped for a major portion thereof to reduce its weight and the space occupied thereby. The closed side of casing 1 is provided with apertures 5, 7, 11 and 13, the latter of which is, in practice, offset slightly from the plane of the former three but for convenience is shown on the drawing as being in the same plane. Positioned in the apertures 5, 7 and 11 are bearings 15, 17 and 19 held in place by caps 21, 23 and 25 secured to the casing 1 by bolts 27—27—27. Directly opposite the apertures 5 and 7 the cover 3 is provided with similar apertures 29 and 31 in which are located bearings 33 and 35, in axial alignment with the bearings 15 and 17, respectively, and held in place by caps 37 and 39 secured to the cover 3 by bolts 41—41.

Journalled in the bearings 15 and 33 is a shaft 43 formed with an intermediate splined portion 45 and a portion of reduced diameter 47. The shaft 43 is held against axial movement in the following manner. The inner race of the bearing 15 engages a shouldered portion of the shaft 43 occasioned by a reduction in diameter thereof adjacent the splined portion 45, while the inner race of bearing 33 engages a similar shouldered portion occasioned by a similar reduction in diameter adjacent the portion 47. The outer races of the bearings 15 and 33, which are adapted to sustain axial thrusts and are preferably of the tapered roller type, as shown, are engaged by the inner faces of caps 21 and 37. Adjustment of the bearings 15 and 33 may be effected by shims, not shown, positioned between the caps 21 and/or 37 and the casing 1 or cover 3 in a well known manner. The opposite ends of the shaft 43 are splined as shown at 49 and 51 for purposes hereinafter described.

Mounted for rotational and axial movement on the reduced section 47 of the shaft 43, is a bearing bushing 48, preferably of bronze and secured thereto by a pin 52, or equivalent means, is a gear 53. The gear 53 is provided on one face thereof with an annular series of clutch teeth 55 formed in the bottom of an axial recess 54 and adapted to cooperate with gear or clutch teeth 57 of a combined gear and clutch element 59. The element 59 is axially slidable on the splined portion 45 of shaft 43 and is rotatable therewith.

Journalled in the bearings 17 and 35, which are of the ball type, is a shaft 61 provided with a splined portion 67 on which are rigidly mounted gears 63 and 65. The gear 63 meshes with the gear 53 and is of the same diameter. The gear 65 is larger in diameter than the gear 63 and is adapted to mesh with the teeth 57 of the combined clutch and gear element 59 when the same is moved to the left and into alignment therewith. The inner races of the bearings 17 and 35 abut the adjacent hub members of gears 63 and 65 which also abut each other. The inner race of the bearing 35 also engages a snap ring 69 carried in a groove on the shaft 61 while the inner race of the bearing 17 is engaged by a thrust ring 71. Bolts 73—73 hold the entire assembly of inner races and gear hubs rigidly on the shaft 61. The outer races of the bearings 17 and 35 are snugly but slidably received by the apertures 7 and 31 and the caps 23 and 39 are designed to provide a clearance so that the assembly of gears 63, 65, the shaft 61, and bearings 17 and 35 are permitted to have a limited axial movement for a purpose to be later explained.

Mounted on the end of shaft 61 is a conventional speedometer gear 75 which is adapted to cooperate with a second speedometer gear, not shown, in a manner well known in the art.

The recess 6 formed by the extended portion 4 of the cover is provided with a partition member 76 having therein an aperture 77 provided with a shoulder 105. Located within this aperture is a bearing 81, axially aligned with the bearing 19 and supporting one end of a specially constructed differential case or carrier 85 the other end of which is supported by the bearing 19. The inner races of the bearings 19 and 81 which are of the tapered roller type, abut suitable shoulders on the case or carrier 85 and the cap 25 securely holds the assemblage of bearings and case 85 firmly against axial movement by virtue of the aforementioned shoulders and the engagement of the outer race of the bearing 81 against the shoulder 105 of recess 77. Adjusting shims, not shown, may be placed between the inner surface of cap 25 and the casing 1 for the purpose of taking up wear in the bearings 19 and 81, in well known manner.

The differential case or carrier 85 carries a conventional differential mechanism on the interior thereof including side gears 87—87, pinions 89 and spider 91. Splined to one of the side gears 87 is a shouldered shaft 93 journaled in a combined radial and thrust bearing 95, formed in the case 85, and projecting outwardly beyond casing 1 through a gland 97 carried by the cap 25. Splined to the other side gear is a second shaft 99 journalled in a bearing 83 positioned in the aperture 79 formed in the extended portion 4 of the cover 3 and in alignment with the apertures 11 and 77. The bearing 83 is held in place by a cap 101 provided with a gland 103, through which the shaft 99 projects, and abuts a shoulder on said shaft occasioned by the splined portion 100.

Secured to the outer surface of the case or carrier 85 by bolts 107, and centered with respect to bearings 19 and 81, is a gear 109 which is of the same diameter as gears 63 and 53. The gears 53, 63 and 109 are all constantly in mesh and are of the so-called "herringbone" type for smoothness and quietness of operation, and also for a further purpose about to be set forth. As gear 53 may move axially of the shaft 43 and since the gear 63, along with gear 65 and shaft 61 may also float axially, it is seen that the gear 75

109, which is rigidly secured to the case 85 and hence held against axial movement, is the only gear of this train which is positioned in a definite axial plane. Due to the nature of the "herringbone" teeth on these gears the gear 109 serves to position the other two gears which are, however, permitted to freely find their own planes of rotation. This arrangement obviates binding and undue wear on the gears, which would be occasioned by improper alignment, and contributes greatly to the smoothness and quietness of operation as well as to the elimination of friction. It is, of course, to be understood that the gears 53, 63 and 109 may be formed as the usual spur type in which case they must be held against undue axial movement with respect to each other in some suitable manner.

The case 85 terminates adjacent the bearing 81 and is provided at this end with a circular series of radially extending clutch teeth 111. As before noted the spline portion 100 of the shaft 99 extends beyond the bearing 81 to the inner race of the bearing 83. Slidably and drivingly mounted on this spline portion 100, in the space between the end of the case 85 and the bearing 83 is a clutch element 115 provided with a circular series of clutch teeth 113 which are similar to, and adapted to engage with, the clutch teeth 111 on the case 85. The clutch element 115 is controlled by a rod 117 carrying a clutch yoke 118 fitting into an annular groove 120 on the clutch element 115. The rod 117 extends outwardly from the casing 1 and is adapted to be connected to a suitable operating means, not shown.

Splined to the end 49 of the shaft 43 is a coupling element 119, only part of which is shown, held in place by the nut 124. The coupling element 119 is adapted to cooperate with a similar coupling element of the usual propeller shaft or equivalent means that transmits power from the vehicle transmission. A sealing element 137 carried by the cap 21 engages the outer periphery of the coupling element to prevent the escape of lubricant from the casing 1. The shafts 93 and 99 are likewise formed at their ends to receive coupling elements, not shown, held in place by the nuts 121—121, and adapted to be connected to front and rear driving axles respectively.

Slidably mounted in the aperture 13 is a control rod 123 provided with spaced circular shaped grooves 125, 127 and 129 and carrying a yoke 131 which fits into an annular groove 132 on the combined clutch and gear element 59. The rod 123 extends to the exterior of the casing, through a gland 139, where it is adapted to be connected to a suitable control means, not shown. An inspection opening at the top of the casing 1 is closed by a cover 133. A spring pressed ball detent 135 is arranged to engage the grooves 125, 127 and 129 and thus hold the rod 123 and hence the clutch element 59 in any one of three selected positions.

The lower portion of the casing 1 is filled with lubricant which is conveyed to the several bearings and gears by splashing in a manner well known in the art. Ducts 141, 143 and 145 are provided to insure proper lubrication of the interior of the differential case 85, the bearing 95 and bushing 51. Thus during operation all moving parts are completely bathed in the lubricant which is constantly being splashed around in the interior of the casing 1 by the action of the several gears. The glands 97, 103, 139 and the sealing element 137 prevent the escape of lubricant from the casing 1 and the entry of dirt or other foreign matter thereinto.

The operation of my improved power transmitting device is believed to be obvious from the foregoing but is described briefly below.

The power transmitting device or transfer case is mounted on the vehicle frame in any suitable manner although the particular mounting means disclosed in the aforementioned copending application is preferable. When such mounting means is employed the cylindrical extension 147 of cap 23 is utilized to cooperate with the mounting means in the manner set forth in said application.

The shaft 43 is connected to the usual vehicle transmission through the coupling element 119 and the shafts 93 and 99 are connected to the front and rear driving axles. With the combined clutch and gear element 59 and the clutch element 115 in the positions shown in the figure, the gear 109 is driven at the same speed as shaft 43, through the equal diameter gears 53 and 63, the gear 109 being of the same diameter as these gears, as above explained. The shafts 93 and 99 are driven differentially through the differential mechanism carried within the case 85 in a manner well known in the art. Any variation in the speed or torque requirements of the shafts is automatically compensated for by the differential mechanism in an obvious manner. Under these circumstances the speed ratio of the complete drive is determined by the vehicle transmission.

When it is desired to change this ratio to a higher value, as for example in "heavy going" where slow speed is required, the combined clutch and gear element 59 is moved to the left and into alignment and meshing with the gear 65 as determined by groove 129 of rod 123. As the gear 65 is larger, and the combined clutch and gear element 59 is smaller than gear 53 it is evident that the gear 109, and hence shafts 93 and 99, will be driven at a slower speed than shaft 43. Hence the speed ratio of the transmission is increased.

As previously noted it is sometimes desirable to lock out or nullify the effect of the differential mechanism, as for example when one set of wheels has lost its traction. This is done in the present device by moving the clutch element 115 to the left, by rod 117, so that the teeth 111 and 113 interengage. The shaft 99 is now locked to the differential case and through the gears 87—87 and pinions 89 to the shaft 93. Thus the two shafts 93 and 99 rotate together and power will be supplied to the set of wheels having good traction. This is especially desirable in trucks or tractor units where one set of wheels may be off the roadway and on slippery ground.

As before mentioned the shaft 43 is provided with splines 51 at one end. These are for the purpose of connecting a power take-off device to the transfer case. Such a power take-off device may be of any conventional design or may take the form of the device shown in Figure 6 of the aforementioned copending application. In any event it is bolted to the cover 3 in place of the cap 37 and connected to the splined end 51 of shaft 43. While such power take-off devices may operate when the vehicle is moving it is generally the case that they function only when the vehicle is stationary. The present invention provides for either mode of operation. When the vehicle is moving the shaft 43 is always driven by the vehicle transmission and as the power take-off device is connected to the shaft 43 and includes a separate clutch member it may be placed in operation at any time during movement of the vehicle. However when it is desired to stop the vehicle, and at the same time operate the power take-off the element 59 is moved to its mid-portion as determined by the groove 127 on the rod 117. In this position the element 59 is unmeshed from gear 65 and disengaged from the clutch teeth 55 of the gear 53. The gear 109 is now disconnected from the shaft 43 and no power is supplied to the shafts 93 or 99 or to the vehicle wheels driven thereby. The power take-off device can still be operated in the usual manner as long as power is supplied to the shaft 43 from the vehicle transmission.

A very important feature of the present invention is the unusually compact arrangement of the speed gearing and differential mechanism within the case. This is accomplished by forming a major part of the casing narrow, or wafer shaped, and providing an extended portion forming a recess to receive a portion of the differential mechanism. The change speed gearing, which is designed to occupy a minimum of lateral space is compactly arranged within the narrow portion of the casing which is made just wide enough to receive the same. Thus the space requirements and weight of the transfer case are both reduced without detriment to the efficiency of the device.

It will also be noted that the gear 109 is secured to the carrier 85 at about a mid-point between the ends thereof and the supporting bearings. This balances and equalizes the loads on said bearings as well as the stress on said carrier thereby adapting the device to carry heavy loads in an efficient and satisfactory manner, all without loss of compactness of the apparatus.

The journalling of the carrier 85, independently of the shafts 93 and 99, strengthens and improves the load carrying capacity of the differential mechanism as a whole due to the superior supporting action of the bearings 19 and 81, and also removes the side-thrust of the gearing from these shafts.

The shafts 93 and 99 are both provided with ample sized bearings 95 and 83 and are also supported against lateral deflection at their inner ends by virtue of the side gears 87—87 to which they are splined.

The bearings for shafts 43 and 61 are likewise of ample size and the positive lubrication assured the several moving parts as above explained contributes to the long life and quiet operation of the device even under severe operating conditions.

In the above description and appended claims the term "herringbone" is employed as a generic term and is intended to embrace the general class of gears whose teeth are formed as to restrain the gears against movement with respect to each other, and which includes double helical gears and the like.

From the above description it is evident that my invention provides a novel mechanism for dividing and diverting the power supplied by the prime mover of a vehicle, and for multiplying the selectivity of the gear ratios of the vehicle transmission as well as providing a differential mechanism which automatically compensates for differences in the speed and torque requirements of the two power output shafts and which may be locked out when desired. The transfer cases are designed with unusual compactness and lightness of structure and the gearing is selected and arranged with the casing to give quiet and efficient operation. The differential mechanism is mounted within the casing to occupy a minimum of space but is rigidly carried by specially arranged bearings of ample size and aligned with its driving gears in the most advantageous manner.

Although I have described my power transmitting device or transfer case, as being used in vehicles wherein the motor is located in the front of the vehicle, it is to be understood that it may be used for driving the rear and/or front wheels of vehicles having the engine mounted in the rear thereof without departing from the spirit of my invention. Moreover, the transfer case herein disclosed may be used for dividing power between the four rear wheels of a multi-wheeled vehicle having dual rear drive axles.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a power transmitting mechanism, a casing, a power input shaft journaled in said casing, a differential carrier journaled at its ends in said casing and rigidly held against axial movement, means to drive said carrier from said input shaft including a gear fixed to said carrier and two axially movable gears, said gears all being of the herringbone type, and constantly meshing, whereby said axially movable gears may freely float to find their proper planes of rotation as located by said gear on said carrier.

2. In a power transmitting mechanism, a casing having a narrow portion and an extended portion forming a recess, a power input shaft journaled in said casing, a bearing carried by said casing opposite said recess, a second bearing positioned in said recess, a third bearing mounted in said extended portion, a differential carrier journaled in said first two bearings, a power output shaft journaled in said carrier, a second power output shaft journaled in said third bearing, differential mechanism carried by said differential carrier and operatively connected to said output shafts, clutch means positioned between said second and third bearings and adapted to connect said second output shaft to said differential carrier whereby said output shafts will be locked together through said differential carrier and said differential mechanism, means to operate said clutch means and means to drive said carrier from said input shaft, said last-named means including change speed gearing positioned in said narrow portion.

3. In a power transmitting device, a casing, a power input shaft, a countershaft and a differential carrier journaled at its ends in said casing, an axially movable gear carried by said input shaft, a first gear fixed to said countershaft, a gear fixed to said carrier, said countershaft being axially movable and said differential carrier being held against axial movement, said gears constantly intermeshing and having teeth of herringbone type whereby said gear fixed to said differential carrier locates said other gears and said other gears are permitted to freely find their proper planes of rotation, a second gear fixed to said countershaft of different diameter from the first gear thereon, means to selectively drive either of said gears on said countershaft from said input shaft including a combined clutch and gear element adapted in one position to mesh with said second gear on said countershaft and in another position to engage said gear on said input shaft, differential mechanism carried by said differential carrier, and power output shafts extending from said casing and driven by said differential mechanism.

4. The power transmitting device set forth in claim 3, wherein means are provided to connect said output shafts for synchronous rotation.

5. In a power transmitting mechanism, a casing having a major portion of reduced width, said major portion having substantially flat side walls, a power input shaft journaled in the side walls of said portion of said casing of reduced width, said shaft projecting outwardly of said casing and adapted to have rotational efforts applied thereto, said input shaft extending transversely of the longitudinal axis of said major portion of said casing; said casing terminating at one end in an extended portion disposed transversely of the longitudinal axis of said major portion thereof, and lying to one side of one of said side walls; a differential carrier disposed entirely within said casing and projecting into the extended portion thereof; said carrier including differential gearing; means for journaling the ends of said differential carrier in said casing; means to drive said differential carrier from said input shaft including change speed gearing positioned in said major portion of reduced width; a pair of power output shafts disposed in end-to-end relationship along an axis parallel to said input shaft and projecting through opposite sides of said casing, said output shafts being journaled in said differential carrier and being driven by said differential gearing; means for selectively connecting said differential carrier to one of said output shafts for coupling said output shafts together for synchronous rotation; said change speed gearing comprising, a countershaft located between and disposed parallel to said input and output shafts and journaled in the side walls of the reduced width portion of said casing; a pair of abutting gears fixed on said countershaft and lying close to the side walls of said casing; a gear fixed on said carrier at a point midway between the ends of the carrier and meshing with one of said countershaft gears; a driving gear journaled for free rotation on said input shaft and constantly meshing with said one countershaft gear; and combined clutch and gear means mounted for axial movement on said input shaft for selectively coupling said driving gear to said input shaft, or transmitting rotational efforts from said input shaft to the other of said countershaft gears.

BEVERLY W. KEESE.